US012545704B2

(12) United States Patent
Park et al.

(10) Patent No.: US 12,545,704 B2
(45) Date of Patent: Feb. 10, 2026

(54) PEPTIDE FOR TREATING INFLAMMATION AND WOUNDS

(71) Applicant: NIBEC CO., LTD., Chungcheongbuk-do (KR)

(72) Inventors: Yoon Jeong Park, Seoul (KR); Chong-Pyoung Chung, Seoul (KR); Jue-Yeon Lee, Gyeonggi-do (KR)

(73) Assignee: NIBEC CO., LTD., Chungcheongbuk-Do (KR)

( * ) Notice: Subject to any disclaimer, the term of this patent is extended or adjusted under 35 U.S.C. 154(b) by 920 days.

(21) Appl. No.: 17/718,758

(22) Filed: Apr. 12, 2022

(65) Prior Publication Data

US 2022/0242904 A1 Aug. 4, 2022

Related U.S. Application Data

(63) Continuation-in-part of application No. PCT/KR2020/015705, filed on Nov. 10, 2020.

(30) Foreign Application Priority Data

Nov. 13, 2019 (KR) .................. 10-2019-0145025

(51) Int. Cl.
| C07K 2/00 | (2006.01) |
| A61P 1/04 | (2006.01) |
| A61P 17/02 | (2006.01) |
| A61P 17/06 | (2006.01) |
| A61P 19/02 | (2006.01) |
| A61P 29/00 | (2006.01) |
| A61P 37/06 | (2006.01) |

(52) U.S. Cl.
CPC .................. *C07K 2/00* (2013.01); *A61P 1/04* (2018.01); *A61P 17/02* (2018.01); *A61P 17/06* (2018.01); *A61P 19/02* (2018.01); *A61P 29/00* (2018.01); *A61P 37/06* (2018.01); *C07K 2319/30* (2013.01)

(58) Field of Classification Search
None
See application file for complete search history.

(56) References Cited

U.S. PATENT DOCUMENTS

| 2010/0093552 A1 | 4/2010 | Panja |
| 2011/0117111 A1 | 5/2011 | Kwon et al. |
| 2011/0183908 A1 | 7/2011 | Ruter et al. |
| 2014/0256643 A1 | 9/2014 | Johnson et al. |
| 2016/0008433 A1 | 1/2016 | Johnson et al. |
| 2016/0178644 A1 | 6/2016 | Hackney et al. |

FOREIGN PATENT DOCUMENTS

| KR | 1020130031870 A | 3/2013 |
| KR | 20130049793 A | 5/2013 |
| KR | 1020160013347 A | 2/2016 |
| KR | 1020180102647 A | 9/2018 |
| KR | 101964376 B1 | 3/2019 |
| WO | 9621458 A1 | 7/1996 |
| WO | 2018112394 A1 | 6/2018 |

OTHER PUBLICATIONS

Hundorfean et al. "Autoimmunity against type VII collagen in inflammatory bowel disease" J. Cell. Mol. Med. 14:2393-2403. (Year: 2010).*
Watanabe et al. "Epidermal aspects of type VII collagen: Implications for dystrophic epidermolysis bullosa and epidermolysis bullosa acquisita" Journal of Dermatology 45:515-521. (Year: 2018).*
Chen, M., et al., "The Epidermolysis Bullosa Acquisita Antigen (Type VII Collagen) is Present in Human Colon and Patients with Chron's Disease have Autoantibodies to Type VII Collagen", Journal of Investigative Dermatology, 2002, pp. 1059-1064, vol. 118, Publisher: The Society for Investigative Dermatology.
Columbel, J.F., et al., "Early Mucosal Healing With Infliximab is Associated With Improved Long-term Clinical Outcomes in Ulcerative Colitis", Gasterenterology, 2011, pp. 1194-1201, vol. 141.
Hughes, B.R., "Epidermolysis bullosa acquisita and total ulcerative colitis", Journal of the Royal Society of Medicine, 1988, pp. 473-475, vol. 81.
Hundorfean, G., et al., "Autoimmunity against type VII collagen in inflammatory bowel disease", J. Cell Mol. Med., 2010, pp. 2393-2403, vol. 14, No. 10, Publisher: Blackwell Publishing Lt.d.
Hvas, C.L., et al., "Current, experimental, and future treatments in inflammatory bowel disease—a clinical review", Immunopharmacology and Immunotoxicology, 2018, pp. 446-460, vol. 40, No. 6, Publisher: Taylor & Francis.

(Continued)

*Primary Examiner* — Sudhakar Katakam
*Assistant Examiner* — Zachary J Miknis
(74) *Attorney, Agent, or Firm* — HULTQUIST, PLLC; Steven J. Hultquist

(57) ABSTRACT

The present invention relates to a peptide for treating inflammation and wounds and, more specifically, to use of a peptide for treating inflammation and wounds, wherein the peptide binds to collagen type VII exposed by damage to tissue and recognizes collagen type VII as an antigen, thereby inhibiting the induction of an immune response, and thus having a function of inhibiting inflammation caused by an autoimmune response, and has the function of promoting wound healing by promoting cell proliferation and migration to a wound site in the damaged tissue. The peptide according to the present invention has the binding ability to collagen type VII, and thus inhibits an immune response caused by collagen type VII, thereby inhibiting inflammation caused by an autoimmune response. In addition, the peptide can bind to the integrin beta 1 of intestinal epithelial cells and increase the cell adhesion and migration via phosphor-FAK signal and tight junction markers are increased via FAK-RhoA signal and thus promote intestine regeneration.

2 Claims, 13 Drawing Sheets

Specification includes a Sequence Listing.

(56) References Cited

OTHER PUBLICATIONS

Jess, T., et al., "Changes in Clinical Characteristics, Course, and Prognosis of Inflammatory Bowel Disease during the Last 5 Decades A Population-Based Study from Copenhagen, Denmark", Inflamm Bowel Dis, 2007, pp. 481-489, vol. 13, No. 4.
Licarete, E., et al., "Prevalence of collagen VII-specific autoantibodies in patients with autoimmune and inflammatory diseases", BMC Immunology, 2012, Pages http://www.biomedcentral.com/1471-2172/13/16, vol. 13, No. 16, Publisher: BioMed Central.
Sandborn, W.J., et al., "Treating beyond symptoms with a view to improving patient outcomes in inflammatory bowel diseases", Journal of Chron's and Colitis, 2014, pp. 927-935, vol. 8, Publisher: Elsevier.
Solberg, I.C., et al., "Clinical Course in Chron's Disease Results of a Norwegian Population-Based Ten-Year Follow-Up Study", Clinical Gastroenterology and Hepatology, 2007, pp. 1430-1438, vol. 5.
Office Action issued in CN202080079686.1 on Sep. 25, 2023.
English translation of Office Action issued in CN202080079686.1 on Sep. 25, 2023.
Search Report issued in CN202080079686.1 on Sep. 13, 2023.
EESR issued in EP 20886929.7 on Nov. 9, 2023.
Li, D., et al., "Progress on the mechanism of action of ginseng-ling-white-jujutsu-san in the treatment of ulcerative colitis", Modern Traditional Chinese Medicine, 2019, pp. 114-119, vol. 39, No. 3, Publisher: China Academic Journal Electronic Publishing House.
Li, D., et al., English Translation of "Progress on the mechanism of action of ginseng-ling-white-jujutsu-san in the treatment of ulcerative colitis", Modern Traditional Chinese Medicine, 2019, pp. 114-119, vol. 39, No. 3, Publisher: China Academic Journal Electronic Publishing House.
Piao, Y., et al., "Guide to Laboratory Techniques in Molecular Pathobiology", People's Military Medical Press, 2015, pp. 254-257, No. 1.
Piao, Y., et al., English Translation of "Guide to Laboratory Techniques in Molecular Pathobiology", People's Military Medical Press, 2015, pp. 254-257, No. 1.
Wang, X., et al., "Topical Application of Recombinant Type VII Collagen Incorporates Into the Dermal-Epidermal Junction and Promotes Wound Closure", Molecular Therapy, 2013, pp. 1335-1344, vol. 21, No. 7, Publisher: The American Society of Gene & Cell Therapy.
Office Action issued on Mar. 5, 2024 for Chinese Patent Application 2020800779686.1.
English Translation of Office Action issued on Mar. 5, 2024 for Chinese Patent Application 2020800779686.1.
Search Report issued on Mar. 4, 2024 for Chinese Patent Application 202080079686.1.

\* cited by examiner a. Colonic epithelial cell migration ability b. Colonic epithelial cell migration area

PEPTIDE FOR TREATING INFLAMMATION AND WOUNDS

CROSS-REFERENCE TO RELATED APPLICATIONS

This is a continuation-in-part under 35 USC § 120 of International Patent Application PCT/KR2020/015705 filed Nov. 10, 2020, which in turn claims the priority under 35 USC § 119 of Korean Patent Application 10-2019-0145025 filed Nov. 13, 2019. The disclosures of all such applications are hereby incorporated herein by reference, in their respective entireties, for all purposes.

REFERENCE TO SEQUENCE LISTING SUBMITTED VIA EFS-WEB

This application includes an electronically submitted sequence listing in .txt format. The .txt file contains a sequence listing entitled "630CIP_SeqListing_ST25.txt" created on Apr. 12, 2022 and is 1,901 bytes in size. The sequence listing contained in this .txt file is part of the specification and is hereby incorporated by reference herein in its entirety.

TECHNICAL FIELD

The present invention relates to a peptide for treating inflammation and wounds, and more particularly to the use of a peptide for the treatment of inflammation and wounds, in which the peptide binds to type VII collagen exposed due to tissue damage to thereby suppress an immune response induced by recognition of type VII collagen as an antigen and thus has a function of inhibiting inflammation caused by an autoimmune response. In addition, the peptide can bind to the integrin beta 1 of intestinal epithelial cells and increase the cell adhesion and migration via phosphor-FAK signal and tight junction markers are increased via FAK-RhoA signal and thus promote intestine regeneration.

BACKGROUND ART

An autoimmune disease is a disease that occurs when the immune system, which is supposed to protect the human body from external pathogens, mistakenly attacks body organs or tracts. Representative autoimmune diseases include rheumatoid arthritis, lupus, Behcet's disease, Crohn's disease, which causes inflammation throughout the digestive tract, childhood diabetes that requires insulin, and the like. Autoimmune diseases are so diverse that at least 80 types have been identified to date. Autoimmune diseases may be divided into organ-specific autoimmune diseases, which occur in specific organs, and systemic autoimmune diseases, which show symptoms throughout the body. Rheumatoid arthritis, psoriasis, lupus, and the like are classified as systemic autoimmune diseases.

Among these, inflammatory bowel disease is a disease that causes chronic inflammation in the gastrointestinal tract and has a clinical course of repeated exacerbation and amelioration, and typical examples thereof include ulcerative colitis and Crohn's disease. The exact cause thereof is still being studied, but it is known to be associated with abnormal immune response regulation. Ulcerative colitis is characterized by inflammation localized in the mucosa and submucosa of the colon, and in most cases, there is a continuous lesion that invades the rectum and spreads proximally. Endoscopic findings include flare of the mucosa, edema, loss of blood vessels, granularity, erosion, bleeding, and ulceration, which are variously observed depending on the disease severity, and there is a clear demarcation between normal tissue and the site of inflammation. On the other hand, in Crohn's disease, inflammation appears throughout the digestive tract from the mouth to the anus, and inflammation is not continuous but is separately distributed in several areas. In about one-third of patients suffering therefrom, only the small intestine is inflamed, in another one-third of patients, chronic inflammation occurs in the colon alone, and chronic inflammation occurs in both the colon and small intestine in the remaining one-third. In particular, inflammation is most common in the ileocecal region, which is the area where the tip of the small intestine meets the colon. Since the entire intestinal wall is invaded, complications such as stenosis and fistulas are common. Both ulcerative colitis and Crohn's disease are chronic intractable diseases in which symptoms repeatedly undergo a cycle of temporary alleviation and then recurrence.

As drugs used for inflammatory bowel disease, aminosalicylic acid preparations, adrenocortical steroids, immunosuppressants, TNF-α monoclonal antibodies, etc. are mainly used, but various side effects have been reported. For example, with regard to sulfasalazine, which is frequently used as an aminosalicylic acid preparation, side effects such as nausea, vomiting, anorexia, rash, headache, liver injury, low white blood cell count, red blood cell abnormality, proteinuria, diarrhea, and the like have been reported. Prednisolone, which is an adrenocortical steroid, has severe side effects such as gastric ulcers and necrosis of the femoral head upon long-term use. Infliximab, which is a TNF-α monoclonal antibody, was approved as a therapeutic drug for Crohn's disease by the US FDA in 1998, and has since been used to treat patients suffering from Crohn's disease, but side effects such as low white blood cell count, drug-induced lupus, reactivation of hepatitis B/tuberculosis and the like have been reported. Moreover, the US FDA has limited use of infliximab and other tumor necrosis factor (TNF) inhibitors because the risk of lymphoma and other cancers may increase and the therapeutic efficacy is less than 40% [Hvas C. L., Bendix M. et al. Current, experimental, and future treatments in inflammatory bowel disease: a clinical review. Immunopharmacology and Immunotoxicology. 40(6), 446-460, 2018].

According to a large cohort study, a significant number of inflammatory bowel disease patients exhibited disease progression despite treatment, resulting in complications, eventually leading to surgery [Jess T., Riis L., Vind I. et al. Changes in clinical characteristics, course, and prognosis of inflammatory bowel disease during the last 5 decades: a population-based study from Copenhagen, Denmark. Inflamm. Bowel Dis. 2007; 13:481-489; Solberg I. C., Vatn M. H., Høet al. Clinical course in Crohn's disease: results of a Norwegian population-based ten-year follow-up study. Clin. Gastroenterol. Hepatol. 2007; 5: 1430-1438.]. This indicates that there is a problem with past treatment strategies aimed at simply relieving symptoms, and means that the intestinal mucosa or intestinal structures must also be healed [Colombel J. F., Rutgeerts P., Reinisch W. et al. Early mucosal healing with infliximab is associated with improved long-term clinical outcomes in ulcerative colitis. Gastroenterology 2011; 141:1194-1201; Sandborn W. J., Hanauer S., Van Assche G. et al. Treating beyond symptoms with a view to improving patient outcomes in inflammatory bowel diseases. J. Crohns Colitis 2014; 8: 927-935.].

However, currently available inflammatory bowel disease drugs merely have effects such as alleviation of symptoms, inflammatory response reduction, and the like, and drugs having the fundamental effect of regenerating damaged intestinal mucosal structures have not yet been developed. Therefore, when proliferation of cells constituting the damaged intestine and cell migration to the damaged site are promoted, the intestinal structure may be regenerated.

In the basement membrane of the intestine or human skin, anchoring fibrils are located from the bottom of the dermal-epidermal basement membrane to the top of the papillary dermis, and both ends thereof bind to the lamina densa to form a U-shaped structure, holding collagen fibers together. Type VII collagen is composed of a chain of [α1(VII)]3, is a major component of anchoring fibrils, and stabilizes binding between the dermis and the epidermis. The NC-1(VII) domain of type VII collagen binds to laminin-332 (laminin-5), laminin-311 (laminin-6), and type IV collagen in the basement membrane (FIG. 1) [Gheorghe Hundorfean, Markus F. Neurath, and Cassian Sitaru. Autoimmunity against type VII collagen in inflammatory bowel disease. J. Cell Mol. Med. 2010 October; 14(10): 2393-2403]. When there is a problem with type VII collagen, type VII collagen is recognized as an antigen and thus an autoantibody to type VII collagen is generated. It is known that autoantibodies to type VII collagen are generated in 68% of patients with Crohn's disease and are generated to a lesser extent in ulcerative colitis patients [Chen M., O'Toole E. A., Sanghavi J. et al. The epidermolysis bullosa acquisita antigen (type VII collagen) is present in human colon and patients with Crohn's disease have autoantibodies to type VII collagen. J. Invest Dermatol. 2002; 118: 1059-64; Hughes B. R., Horne J. Epidermolysis bullosa acquisita and total ulcerative colitis. J. R. Soc. Med. 1988; 81: 473-5.]. The autoimmune response to type VII collagen is known to be associated with diseases such as epidermolysis bullosa acquisita (EBA), bullous systemic lupus erythematosus, and inflammatory bowel disease. When there is a problem with type VII collagen, the tissue becomes loose due to poor fixation, and the autoantibody attacks type VII collagen, which further increases the inflammatory response, ultimately further increasing the extent of tissue damage. Therefore, when preventing type VII collagen from acting as an antigen due to binding to type VII collagen, it is possible to suppress the induction of an immune response due thereto.

Accordingly, the present inventors have ascertained that the conventional peptide developed by the present inventors is able to bind to type VII collagen to thus inhibit the induction of an immune response due to type VII collagen, the peptide promotes the proliferation and migration of cells constituting damaged tissue, and the peptide exhibits therapeutic effects when administered to animal models of DSS-induced acute and chronic inflammatory bowel disease, thereby completing the present invention.

SUMMARY OF THE INVENTION

It is an object of the present invention to provide the novel use of a peptide effective for the treatment or prevention of inflammation and healing of wounds.

In order to accomplish the above object, the present invention provides a peptide that has the binding ability to type VII collagen and is represented by any one of the amino acid sequences of SEQ ID NOs: 1 to 3.

In addition, the present invention provides a pharmaceutical composition for treating inflammation and/or wounds comprising, as an active ingredient, at least one peptide selected from among peptides represented by the amino acid sequences of SEQ ID NOs: 1 to 3.

In addition, the present invention provides a method of treating or preventing inflammation and/or wounds comprising administering at least one peptide selected from among peptides represented by the amino acid sequences of SEQ ID NOs: 1 to 3 to a subject in need of treatment or prevention of inflammation and/or wounds.

In addition, the present invention provides the use of any one peptide selected from among peptides represented by the amino acid sequences of SEQ ID NOs: 1 to 3 or the pharmaceutical composition for the treatment or prevention of inflammation and/or wounds.

In addition, the present invention provides the use of any one peptide selected from among peptides represented by the amino acid sequences of SEQ ID NOs: 1 to 3 for the manufacture of a medicament for the treatment or prevention of inflammation and/or wounds.

DETAILED DESCRIPTION AND PREFERRED EMBODIMENTS OF THE INVENTION

Figure 1:
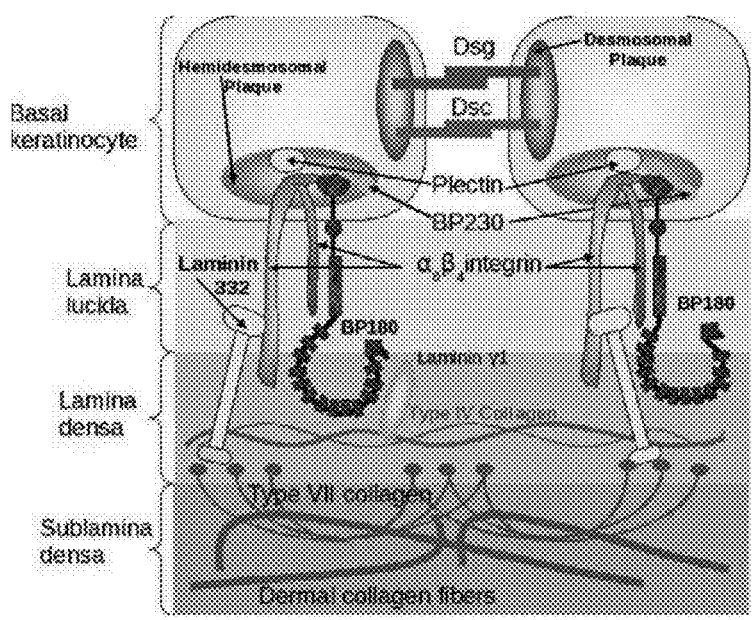
FIG. 1 shows the structure of the basement membrane.

Unless otherwise defined, all technical and scientific terms used herein have the same meanings as those typically understood by those skilled in the art to which the present invention belongs. Generally, the nomenclature used herein and test methods described below are well known in the art, and are typical.

In the present invention, it is confirmed that the peptide represented by any one of the amino acid sequences of SEQ ID NOs: 1 to 3 below has the binding ability to type VII collagen to thus suppress the immune response induced by type VII collagen, and promotes cell proliferation and migration in damaged tissue, thereby exhibiting a therapeutic effect on inflammatory colitis associated therewith.

```
Human bone sialoprotein I 149-169
SEQ ID NO: 1:
YGLRSKSKKFRRPDIQYPDAT

Human bone sialoprotein II 41-60
SEQ ID NO: 2:
RPRYYLYKHAYFYPHLKRFP

Human osteonectin 160-173
SEQ ID NO: 3:
LTEFPLRMRDWLKN
```

Accordingly, an aspect of the present invention pertains to a peptide having the binding ability to type VII collagen, as represented by any one of the amino acid sequences of SEQ ID NOs: 1 to 3, and another aspect of the present invention pertains to a pharmaceutical composition for treating inflammation and/or wounds comprising, as an active ingredient, at least one peptide selected from among peptides represented by the amino acid sequences of SEQ ID NOs: 1 to 3.

In the present invention, "at least one peptide selected from among peptides represented by the amino acid sequences of SEQ ID NOs: 1 to 3" refers to the peptide represented by the amino acid sequence of SEQ ID NO: 1, the peptide represented by the amino acid sequence of SEQ ID NO: 2, the peptide represented by the amino acid sequence of SEQ ID NO: 3, any two peptides among three peptides represented by the amino acid sequences of SEQ ID NOs: 1 to 3, or all three peptides represented by the amino acid sequences of SEQ ID NOs: 1 to 3.

Specifically, in the present invention, the pharmaceutical composition for treating inflammation and/or wounds comprising, as an active ingredient, at least one peptide selected from among peptides represented by the amino acid sequences of SEQ ID NOs: 1 to 3 may be embodied as, for example, a pharmaceutical composition for the treatment of inflammation and/or wounds comprising the peptide represented by the amino acid sequence of SEQ ID NO: 1 as an active ingredient, a pharmaceutical composition for the treatment of inflammation and/or wounds comprising the peptide represented by the amino acid sequence of SEQ ID NO: 2 as an active ingredient, or a pharmaceutical composition for the treatment of inflammation and/or wounds comprising the peptide represented by the amino acid sequence of SEQ ID NO: 3 as an active ingredient. Moreover, the pharmaceutical composition may be embodied as a pharmaceutical composition for the treatment of inflammation and/or wounds comprising, as an active ingredient, a mixture of peptides of SEQ ID NO: 1 and SEQ ID NO: 2, SEQ ID NO: 1 and SEQ ID NO: 3, SEQ ID NO: 2 and SEQ ID NO: 3, or all of SEQ ID NO: 1, SEQ ID NO: 2 and SEQ ID NO: 3. Hereinafter, the present invention should also be understood in the same context from the viewpoint of uses and treatment methods.

In the present invention, the inflammation may be inflammation caused by an autoimmune disease, and the autoimmune disease may be selected from the group consisting of arthritis, inflammatory colitis, ulcerative enteritis, Crohn's disease, Behcet's disease, and inflammatory bowel disease, but is not limited thereto. The present invention may be used for the treatment or prevention of inflammation and/or healing of wounds due to all autoimmune diseases related to the immune response induced by type VII collagen and to tissue damage.

In the present invention, the autoimmune disease is an autoimmune disease in which type VII collagen acts as an antigen to thus induce an immune response, for example, an autoimmune disease caused by an immune response induced by type VII collagen present in the basement membrane of the intestine or skin. Meanwhile, since the peptide has the binding ability to type VII collagen, it is possible to suppress an inflammatory response or tissue damage caused by an autoimmune response triggered due to exposure of type VII collagen in vivo. This is because the peptide binds to type VII collagen and inhibits type VII collagen from acting as an antigen to thus suppress an autoimmune response, thereby preventing inflammation from occurring, and moreover, promotes cell proliferation and migration upon tissue damage, ultimately quickly healing wounds.

Moreover, the present invention also binds to integrin beta 1, which acts as a key molecule for migration and proliferation of epithelial cells. Resulting from inflammation, immune responses damage epithelial layer of the intestine or skin. During wound healing process, integrin beta 1 expression speeds up the recovery of epithelial cells via enhanced migration and proliferation. Binding to integrin beta 1 protein with peptide can stimulate increased expression of integrin beta 1 and promote cell proliferation and migration, ultimately recover tissue function in homeostasis.

In the present invention, the pharmaceutical composition may be formulated into any one dosage form selected from the group consisting of injections, preparations for oral administration, patches, solutions, capsules, granules, tablets, powders, sprays, ointments, gels, mucosal administration preparations, and suppositories, but is not limited thereto. These formulations may be prepared through typical methods used for formulation in the art or methods disclosed in Remington's Pharmaceutical Science (latest edition), Mack Publishing Company, Easton PA, and may be prepared in various dosage forms depending on the individual disease or constitution. However, the above description is exemplary, and the formulation to which the present invention is applicable is not limited thereto.

In the present invention, the pharmaceutical composition may further contain an acceptable adjuvant, and the adjuvant may be, for example, a carrier. The pharmaceutically acceptable carrier may be selected from among saline, sterile water, Ringer's solution, buffered saline, dextrose solution, maltodextrin solution, glycerol, ethanol, and mixtures of one or more of these components, and other typical additives such as antioxidants, buffers, and bacteriostats may be added, as necessary. Moreover, diluents, dispersants, surfactants, binders, and lubricants may be additionally added to form injectable formulations such as aqueous solutions, suspensions, emulsions, etc., pills, capsules, granules, or tablets. However, the above description is exemplary, and the adjuvants or carriers usable in the present invention are not limited thereto.

The composition of the present invention may be administered orally or parenterally (e.g. intravenously, subcutaneously, intraperitoneally or topically) according to a desired method, and the dose thereof may vary depending on the body weight, age, gender, and health status of the patient, diet, administration time, administration method, excretion rate, and severity of the disease. The daily dose of the peptide of SEQ ID NOS: 1 to 3 of the present invention is about 1 µg/kg to 100 mg/kg, and preferably 5 µg/kg to 50 mg/kg, and administration may be carried out once a day or 1-3 times a week, but the dose and administration interval are not limited thereto.

As such, the dosage regimen and dose may vary depending on the age, body weight and response of individual patients. Suitable dosage regimens and doses may be readily selected by those of ordinary skill in the art taking these factors into account.

Still another aspect of the present invention pertains to a method of treating or preventing inflammation and/or wounds comprising administering at least one peptide selected from among peptides represented by the amino acid sequences of SEQ ID NOs: 1 to 3 to a subject in need of treatment or prevention of inflammation and/or wounds.

Yet another aspect of the present invention pertains to the use of any one peptide selected from among peptides represented by the amino acid sequences of SEQ ID NOs: 1 to 3 or the pharmaceutical composition for the treatment or prevention of inflammation and/or wounds.

Still yet another aspect of the present invention pertains to the use of any one peptide selected from among peptides represented by the amino acid sequences of SEQ ID NOs: 1 to 3 for the manufacture of a medicament for the treatment or prevention of inflammation and/or wounds.

In the present invention, the specific amino acid sequence for SEQ ID NOs: 1 to 3 has been described, but amino acid sequence of an equivalent range in which a portion of the amino acid sequence of the present invention is modified without exceeding the technical scope of the present invention is to be construed as falling within the scope of the present invention, as will be apparent to those skilled in the art.

EXAMPLES

A better understanding of the present invention may be obtained through the following examples. These examples are merely set forth to illustrate the present invention, and are not to be construed as limiting the scope of the present invention, as will be apparent to those skilled in the art.

Example 1: Peptide Synthesis

Amino acids and reagents for synthesis were purchased from GL Biochem and Sigma-Aldrich. Peptides were synthesized from the C-terminus through an F-moc solid-phase chemical synthesis method using a synthesizer. Specifically, synthesis was performed using a Rink resin (0.075 mmol/g, 100 to 200 mesh, 1% DVB crosslinking) to which Fmoc-(9-fluorenylmethoxycarbonyl) was linked as a blocking group, 50 mg of the Rink resin was placed in the synthesizer, DMF was added to cause the resin to swell, and the Fmoc-group was removed using a 20% piperidine/DMF solution. In accordance with the sequence from the C-terminus, a 0.5 M amino acid solution (solvent: dimethylformamide, DMF), 1.0 M DIPEA (solvent: dimethylformamide & N-methylpyrrolidone, DMF & NMP), and 0.5 M HBTU (solvent: dimethylformamide, DMF) were added in respective amounts of 5, 10, and 5 equivalents and allowed to react for 1 to 2 hours under a nitrogen stream. Each time the deprotection and coupling steps were finished, washing was performed twice with DMF and isopropanol. Deprotection was performed again after coupling of the last amino acid to remove the Fmoc-group.

The synthesis was confirmed using a ninhydrin test method, and the resin, the synthesis of which was verified to be completed through testing, was dried over tetrahydrofuran (THF) or dichloromethane (DCM), added with a trifluoroacetic acid (TFA) cleavage cocktail at a ratio of 20 ml to 1 g of the resin, mixed for 3 hours with shaking, and then filtered to separate the resin from the cocktail in which the peptide was dissolved. The filtered solution was removed using a rotary evaporator, after which cold ether was added, or an excess of cold ether was added directly to the TFA cocktail solution in which the peptide was dissolved, whereby the peptide was crystallized into a solid phase, followed by separation through centrifugation. Here, the TFA cocktail was completely removed through washing with ether several times and centrifugation. The peptide thus obtained was dissolved in distilled water and freeze-dried.

The synthesized peptide was subjected to separation and purification through high-performance liquid chromatography (Shimadzu, Japan) after cleavage from the resin, washing, and freeze-drying. Using a C18 column having a diameter of 4.6 mm, analysis was performed in a manner of allowing 0.1% TFA/H$_2$O and 0.092% TFA/acetonitrile to flow at a flow rate of 1 ml/min with a gradient of 0 to 60% for 30 minutes. Here, the wavelength of the UV detector was 220 nm. Purification was performed using a column having a diameter of 2.2 cm at a flow rate of 20 ml/min using the same solvent and detection wavelength as above. The molecular weight of the purified peptide was determined through mass spectrometry.

The sequences of the synthesized peptides were as follows.

```
Human bone sialoprotein I 149-169
SEQ ID NO: 1:
YGLRSKSKKFRRPDIQYPDAT

Human bone sialoprotein II 41-60
SEQ ID NO: 2:
RPRYYLYKHAYFYPHLKRFP
```

-continued

```
Human osteonectin 160-173
SEQ ID NO: 3:
LTEFPLRMRDWLKN
```

Figure 2:
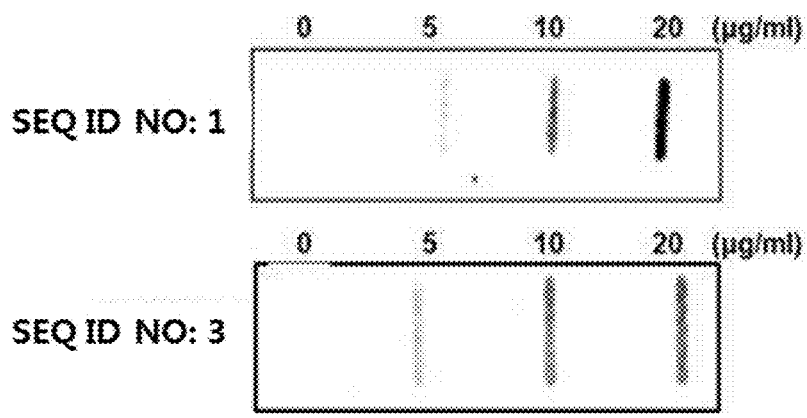
FIG. 2 shows results confirming the ability of SEQ ID NOS: 1 and 3 to bind to type VII collagen through slot blotting.

Experimental Example 1: Confirmation of the Binding Ability to Type VII Collagen Slot blotting was performed to confirm the ability of the peptides of SEQ ID NOS: 1 and 3 to bind to type VII collagen. The NC membrane was activated with TBST, and the peptides of SEQ ID NOS: 1 and 3 were placed in each well at different concentrations (5, 10, and 20 µg/mL) and allowed to bind to the NC membrane in a vacuum for 2 hours. A 1% solution of type VII collagen (MyBioSource, Inc., San Diego, CA, USA, MBS2018615) was added to the peptide-bound membrane and allowed to bind to the membrane in a vacuum for 2 hours. After washing the membrane with TBST, the membrane to which the peptide and type VII collagen were attached was allowed to react with a primary rabbit anti-human type VII collagen antibody (MyBioSource, Inc., San Diego, CA, USA, MBS2004594) at a dilution ratio of 1:800 and with a secondary antibody goat anti-rabbit Ig G (BETHYL Lab., Montgomery, TX, USA, A90-116P) at a dilution ratio of 1:5000. The reacted membrane was washed with TBST, and a chemiluminescence test was performed using WEST-one. Based on the results of measurement of the ability of the peptide to bind to type VII collagen depending on the peptide concentration, when the concentration of the peptide of SEQ ID NO: 1 was 10 µg/mL or more or the concentration of the peptide of SEQ ID NO: 3 was 5 µg/mL or more, the ability thereof to bind to type VII collagen was confirmed (FIG. 2).

Figure 3:
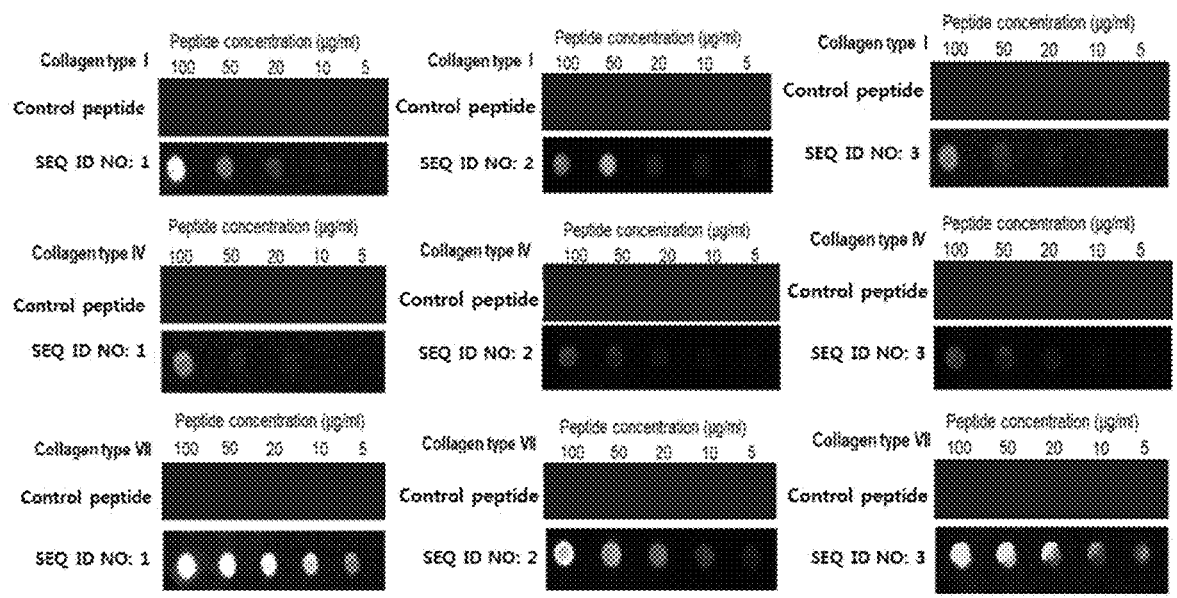
FIG. 3 shows results confirming the selectivity of peptides of SEQ ID NOS: 1, 2 and 3 to types I, IV and VII collagen through slot blotting.

Experimental Example 2: Confirmation of Ability of Synthesized Peptide to Selectively Bind to Type VII Collagen In order to confirm the selectivity of peptides of SEQ ID NOS: 1 to 3 to collagen types, slot blotting was performed for types I, IV and VII collagen. The NC membrane was activated with TBST, and the peptides of SEQ ID NOS: 1, 2 and 3 were placed in each well at different concentrations (5, 10, 25, 50, and 100 µg/mL) and allowed to bind to the NC membrane in a vacuum for 2 hours. A 1% solution of each of types I, IV and VII collagen (MyBioSource, Inc., San Diego, CA, USA, MBS2018615) was added to the peptide-bound membrane and allowed to bind to the membrane in a vacuum for 2 hours. The membrane was washed with TBST, and the membrane to which the peptides and types I, IV, and VII collagen were attached was allowed to react with a primary rabbit anti-human type VII collagen antibody (MyBioSource, Inc., San Diego, CA, USA, MBS2004594) at a dilution ratio of 1:800 and with a secondary antibody goat anti-rabbit Ig G (BETHYL Lab., Montgomery, TX, USA, A90-116P) at a dilution ratio of 1:5000. The reacted membrane was washed with TBST, and a chemiluminescence test was performed using WEST-one. The results thereof are shown in FIG. 3. The peptide of SEQ ID NO: 1 was observed to bind to type VII collagen at a concentration of at least 5 µg/mL, to type I collagen at 50 µg/mL, and to type IV collagen at 100 µg/mL. The peptide of SEQ ID NO: 2 was observed to bind to type VII collagen at a concentration of at least 20 µg/mL and to type I collagen at 50 µg/mL, but did not bind to type IV collagen. The peptide of SEQ ID NO: 3 was observed to bind to type VII collagen at a concentration of at least 10 µg/mL and to type I collagen at 100 µg/mL, but did not bind to type IV collagen.

It was found that the peptides of SEQ ID NOS: 1, 2, and 3 had higher selectivity to type VII collagen than types I and IV collagen.

Experimental Example 3: Confirmation of Wound-Healing Marker Expression in Colonic Epithelial Cells by Synthesized Peptide In order to confirm the expression level of the wound-healing marker in colonic epithelial cells (Caco-2 cell, ATCC® HTB-37™) by the peptide according to the present invention, colonic epithelial cells were dispensed in an amount of $5 \times 10^6$ cells/well in a 6-well plate and then cultured for 24 hours in DMEM (Dulbecco's Modified Eagle Medium, Gibco). The cells were treated with the peptides of SEQ ID NOS: 1, 2, and 3 at concentrations of 50 and 100 µg/ml and then cultured for up to 3 days. After 3 days, the cells were harvested and the gene expression levels of E-cadherin protein, which is highly expressed in colonic epithelial cells, and ZO-1 protein, which is highly expressed at the tight junction between colonic epithelial cells, were measured through real-time RT-PCR.

RNA was extracted from the obtained cells using TRIzol, and cDNA was synthesized using a kit from Thermo Scientific (cat. No. K1641). The same amount of cDNA was amplified by 40 cycles at 95° C.-60° C. using a SYBR green PCR master mix and a StepOnePlus™ Real-Time PCR System available from Applied Biosystems, and the ΔΔct values of individual groups were compared. The nucleotide sequences of the PCR primers used for amplification of each gene are as follows.

```
E-cadherin
Forward primer:
5'-AGGGGTTAAGCACAACAGCA-3'

Reverse primer:
5'-ACGACGTTAGCCTCGTTCTC-3'

ZO-1
Forward primer:
5'-CCAGCTGGTATGGGTTTCC-3'

Reverse primer:
5'-TCTACTGTCCGTGCTATACATTGAGT-3'
```

Figure 4:
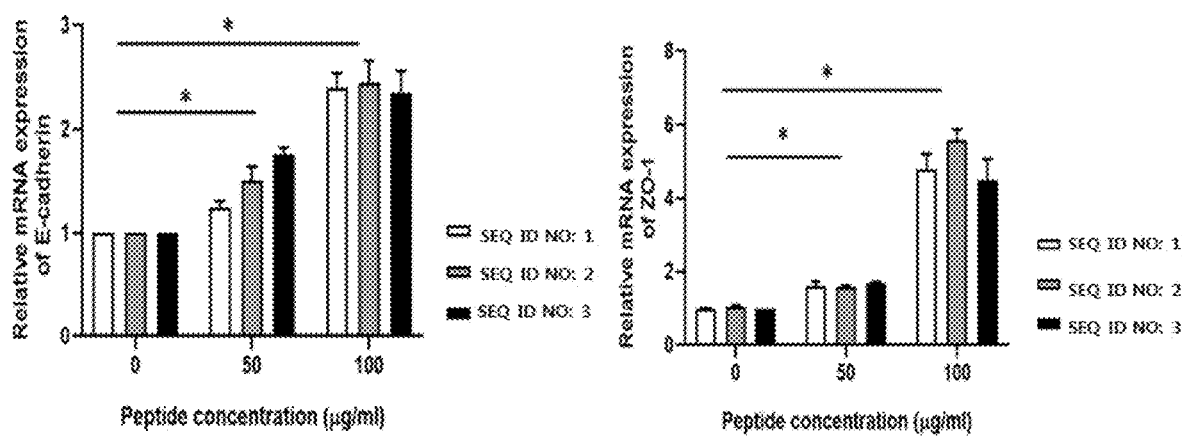
FIG. 4 shows the results of real-time RT-PCR measurement of gene expression levels of E-cadherin and ZO-1 protein when treated with the peptides of SEQ ID NOS: 1, 2, and 3.

As shown in FIG. 4, when the cells were treated with the peptides of SEQ ID NOS: 1, 2, and 3, the gene expression of E-cadherin and ZO-1 increased with an increase in the concentration of the peptide. Therefore, it was found that the peptides of SEQ ID NOS: 1, 2, and 3 increased the proliferation of colonic epithelial cells at the damaged site, and thus had the effect of wound healing.

Figure 5:
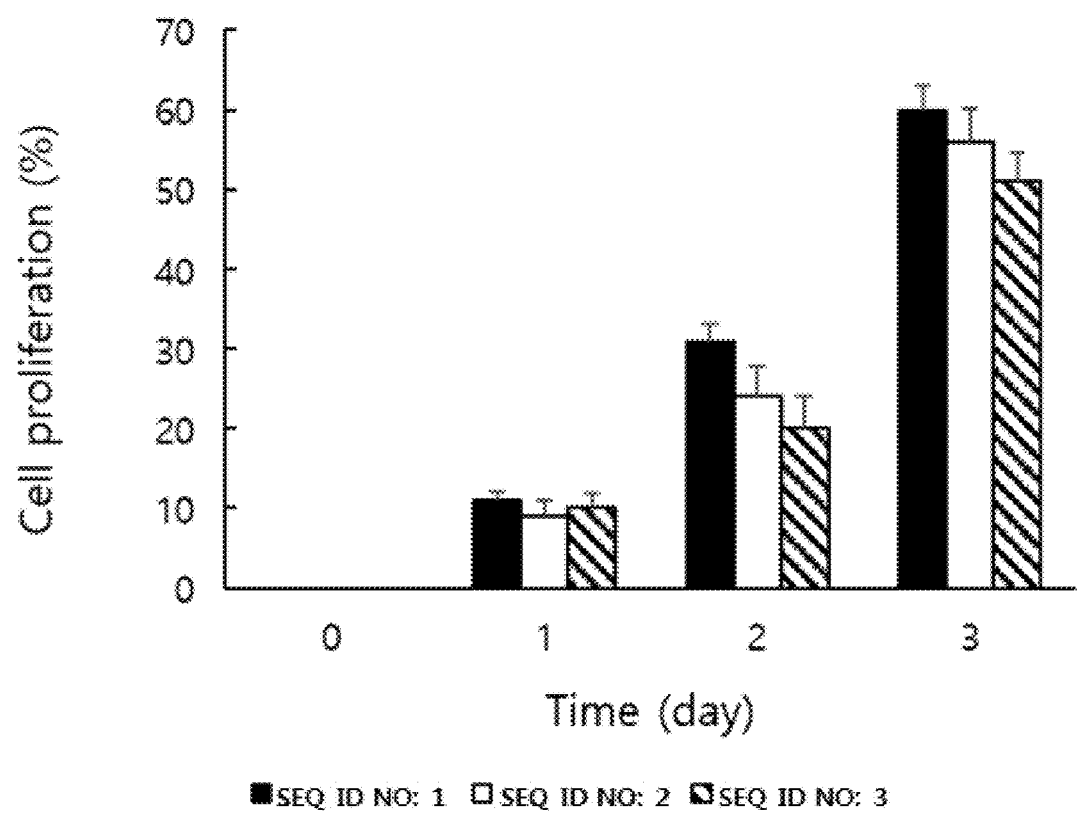
FIG. 5 shows results confirming the effects of the peptides of SEQ ID NOS: 1, 2, and 3 on the proliferation of epithelial cells depending on changes in the concentration thereof.

Experimental Example 4: Confirmation of Proliferation and Migration in Colonic Epithelial Cells In order to confirm the proliferation and migration in colonic epithelial cells (Caco-2 cell, ATCC® HTB-37™) by the peptide according to the present invention, the cells were dispensed in an amount of $5 \times 10^3$ cells/well in a 96-well plate and then cultured for 24 hours in DMEM (Dulbecco's Modified Eagle Medium, Gibco). The peptides (SEQ ID NOS: 1, 2, and 3) were dispensed at a concentration of 100 µM in the cells and then cultured for up to 3 days at intervals of 1 day. The cell count was measured using a CCK-8 (Cell Counting Kit-8, CK04, Dojindo Lab.). After 1, 2, and 3 days, the medium containing the peptide was removed, 10% of a CCK-8 solution was added to fresh DMEM, and 100 μl thereof was then dispensed. After 1 hour and 30 minutes, absorbance was measured at 450 nm. As shown in FIG. 5, by the $3^{rd}$ day, the peptides of SEQ ID NOS: 1, 2, and 3 exhibited cell proliferation rates of 60%, 56%, and 51% compared to the control group (cells not treated with the peptide).

Figure 6:
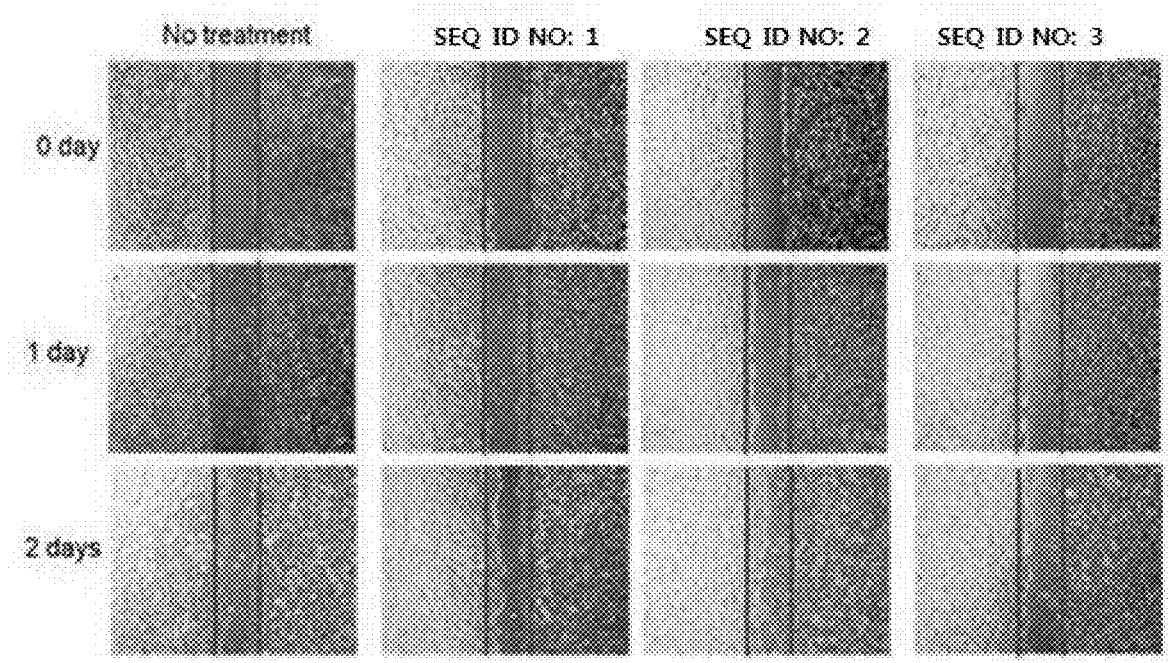
FIG. 6 in part a thereof (Colonic epithelial cell migration ability) sets forth images showing the migration of epithelial cells depending on changes in the concentration of the peptides of SEQ ID NOS: 1, 2, and 3, and FIG. 6 in part b thereof (Colonic epithelial cell migration area) shows results confirming the migration area of epithelial cells depending on changes in the concentration of the peptides of SEQ ID NOS: 1, 2 and 3.
Figure 6:
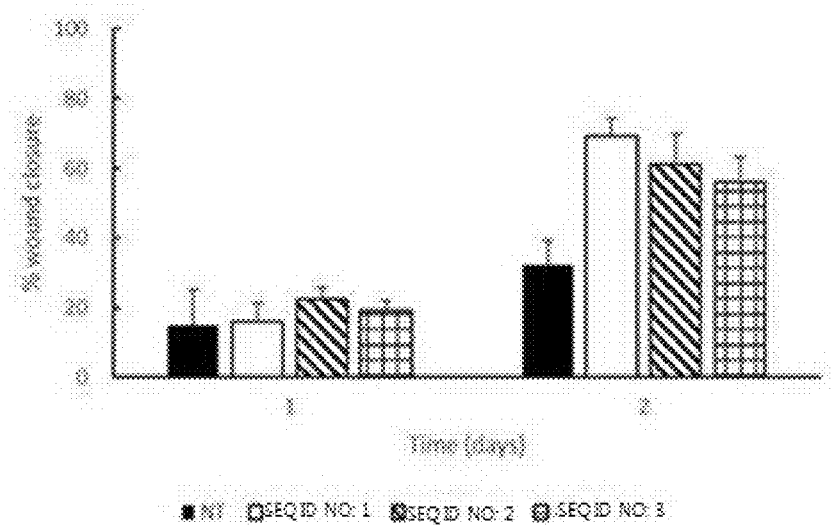

In order to measure cell migration ability, Caco-2 cells ($1 \times 10^6$ cells) were placed in a 6-well plate and cultured in DMEM supplemented with 10% fetal bovine serum (FBS) and 1% antibiotic-antimycotic solution (Gibco, Grand Island, N.Y., USA). The cells were washed with PBS and allowed to stand overnight in a medium containing 2% FBS. The central portion of the cell layer was scratched using a sterile 200 μl plastic pipette tip. The scratched cell layer was washed twice with PBS to remove unadhered cells. Each of the peptides of SEQ ID NOS: 1, 2, and was added at a concentration of 100 μM to the medium, followed by culture for up to 48 hours. The extent of cell migration toward the center from the scratched edges was measured using an Olympus CKX41 inverted microscope (magnification: ×20). As shown in FIG. 6, the peptides of SEQ ID NOS: 1, 2, and 3 exhibited increased cell migration compared to cells not treated with the peptide. Moreover, the peptides of SEQ ID NOS: 1, 2, and 3 showed migration areas of 65%, 75%, and 56% on the $2^{nd}$ day.

Experimental Example 5: Confirmation of Distribution of Synthesized Peptide to Colon in Animal Model of DSS-Induced Acute Inflammatory Bowel Disease In order to confirm distribution of the synthesized peptide to the colon, inflammation was induced in mice using 5% DSS as drinking water for 7 days, after which the Cy5.5-labeled peptide of SEQ ID NO: 1 was IP-injected thereto. After injection, each mouse was sacrificed at 30 minutes, 60 minutes, and 180 minutes, and the peptide distribution in major organs was observed with IVIS.

Figure 7:
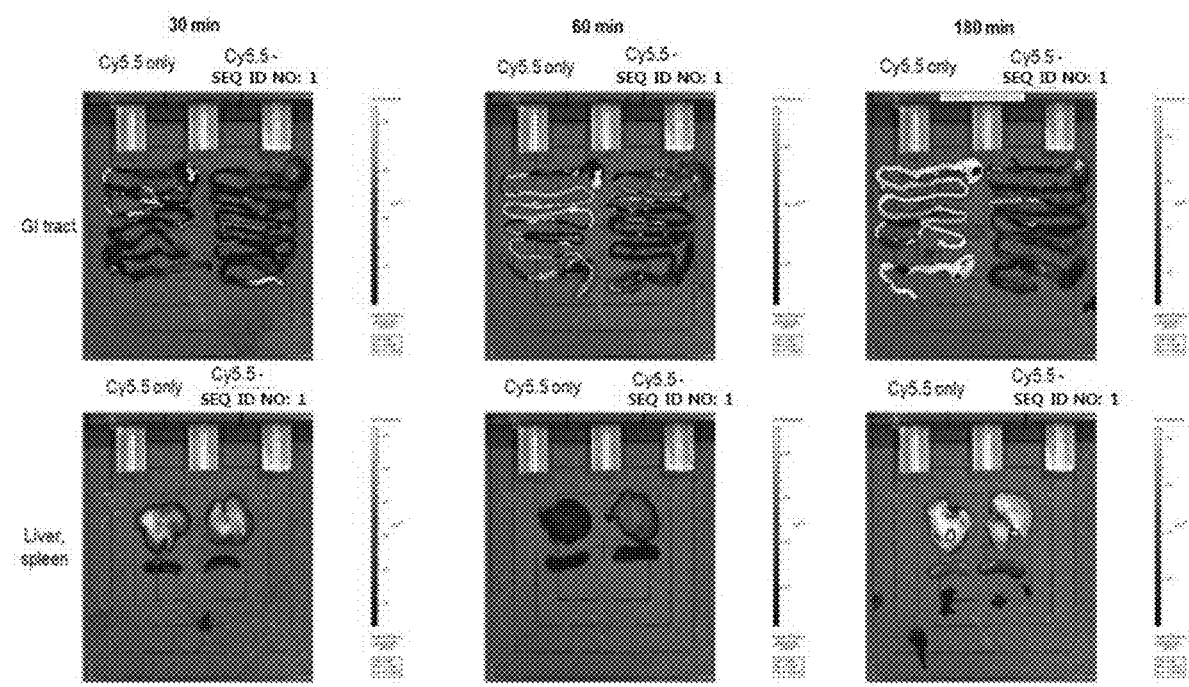
FIG. 7 shows results of observation with IVIS for the peptide distribution in major organs after intraperitoneal injection (IP injection) of the Cy5.5-labeled peptide of SEQ ID NO: 1 to animal models of DSS-induced acute inflammatory bowel disease in order to confirm the distribution of SEQ ID NO: 1 in the colon.

As shown in FIG. 7, in the control group using the Cy5.5 fluorescent material, fluorescence was observed in the colon at the initial stage of injection, but almost no fluorescence was observed at 180 minutes. However, for the peptide of SEQ ID NO: 1, red fluorescence was constantly observed in the small intestine and colon from the initial 30 minutes to 180 minutes. This indicated that the peptide of SEQ ID NO: 1 was bound to type VII collagen in the colon and maintained.

Experimental Example 6: Confirmation of Therapeutic Effect of Synthesized Peptide in Animal Model of DSS-Induced Acute Inflammatory Bowel Disease In order to confirm the therapeutic effect of the synthesized peptide in animals, acute inflammatory bowel disease was induced with DSS in ICR mice (Orient Bio), and simultaneously, the synthesized peptide was injected thereto. Inflammation was induced in mice using 5% DSS as drinking water for 7 days, and simultaneously, the synthesized peptide was IP-injected thereto. The normal group (Normal, n=6) was not treated with DSS, and in the untreated group (No treatment, n=6), only DSS was used, and no drug was injected. The positive control group (SAHA, Sigma-Aldrich, 25 mg/kg, n=6), the immunomodulatory control group (Anti-TNF-a antibody, Pfizer, 1 mg/kg, n=6), and the peptide of SEQ ID NO: 1 (50 mg/kg, n=6) were injected once daily. After 7 days, mice were sacrificed by $CO_2$ hyperventilation, the colons were collected, and the lengths thereof were compared. Additionally, the tissue was fixed and processed to prepare a paraffin block, and H&E staining was performed to determine whether the intestinal tissue was damaged.

Figure 8:
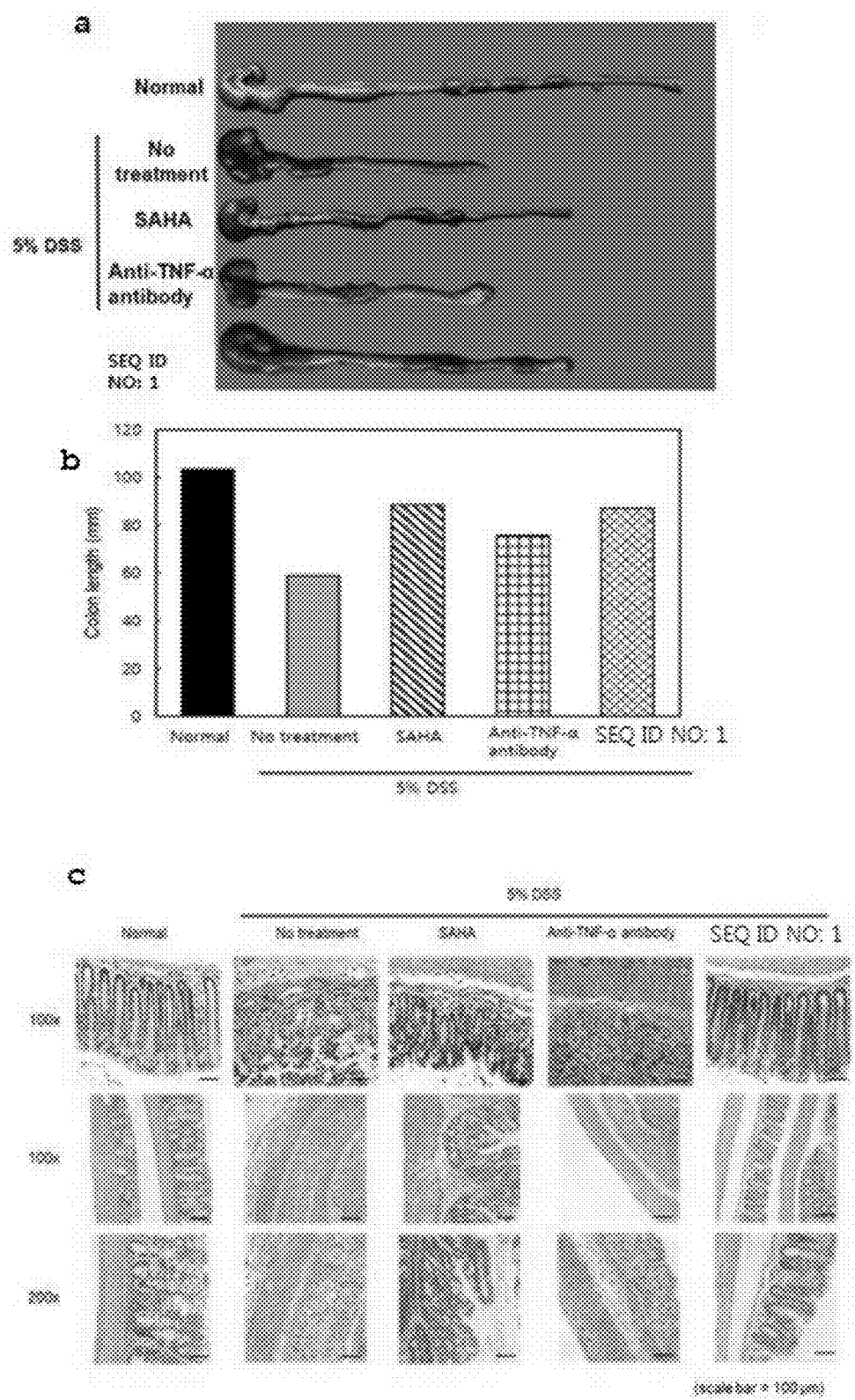
FIG. 8 in part a thereof shows a photograph of the shape of the colon extracted from animal models of DSS-induced acute inflammatory bowel disease, in part b thereof shows results of measurement of the length thereof, and in part c shows results of H&E staining of the colon extracted from animal models of DSS-induced inflammatory bowel disease.

On the $10^{th}$ day of the experiment, the colon was removed from mice and the colon length was measured. In the untreated group with DSS-induced colitis (No treatment), the colon length was remarkably shortened compared to the normal group (Normal), and redness of colon tissue was observed (FIG. 8 in part a and part b thereof). Significantly ($p<0.05$) differently from the untreated group, the groups injected with the peptide of SEQ ID NO: 1 and with SAHA maintained the colon length, and the anti-TNF-a antibody showed that the colon length was similar to that of the untreated group.

Based on the results of histological observation, in the DSS-induced inflammation group, the inflammatory cell count was increased, intestinal villi were damaged, and many inflammatory cells (purple dots) were observed in the intestinal mucosa. In the group treated with anti-TNF-a antibody, similar villi damage and inflammatory cells in the intestinal mucosa were observed. In the group administered with SAHA and the group administered with the peptide of SEQ ID NO: 1, it was observed that the villi structure was maintained well and also that the inflammatory cell count in the intestinal mucosa was significantly decreased (FIG. 8 in part c thereof).

Figure 9A:
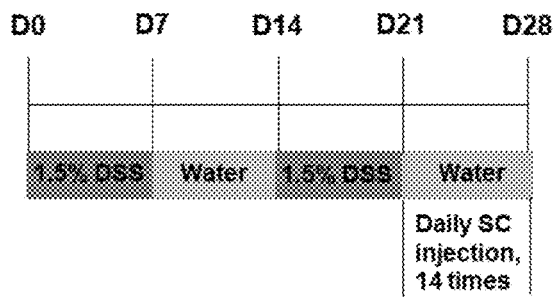
FIG. 9A shows an experimental plan using animal models of DSS-induced chronic inflammatory bowel disease.

Experimental Example 7: Therapeutic Effect of Synthesized Peptide in Animal Model of DSS-Induced Chronic Inflammatory Bowel Disease In order to confirm the therapeutic effect of the synthesized peptide in animals, chronic inflammatory bowel disease was induced with DSS in ICR mice (Orient Bio). 1.5% DSS was used as drinking water for 7 days, water not containing DSS was provided for the next 7 days, and 1.5% DSS was used as drinking water for the next 7 days (FIG. 9A). Thereafter, the peptide of SEQ ID NO: 1 was administered through SC injection. The normal group (Normal, n=9) was not treated with DSS, and the untreated group (Untreated, n=9) was treated only with DSS, and no drug was injected. The positive control group (Infliximab, 5 mg/kg, n=9) and the peptide of SEQ ID NO: 1 (30 mg/kg, n=9) were injected once daily for 14 days. 28 days after the start of DSS administration, the animals were sacrificed by $CO_2$ hyperventilation, the colons were collected, and the lengths thereof were compared. Additionally, the tissue was fixed and processed to prepare a paraffin block, and H&E staining was performed to determine whether the intestinal tissue was damaged.

Figure 9B:
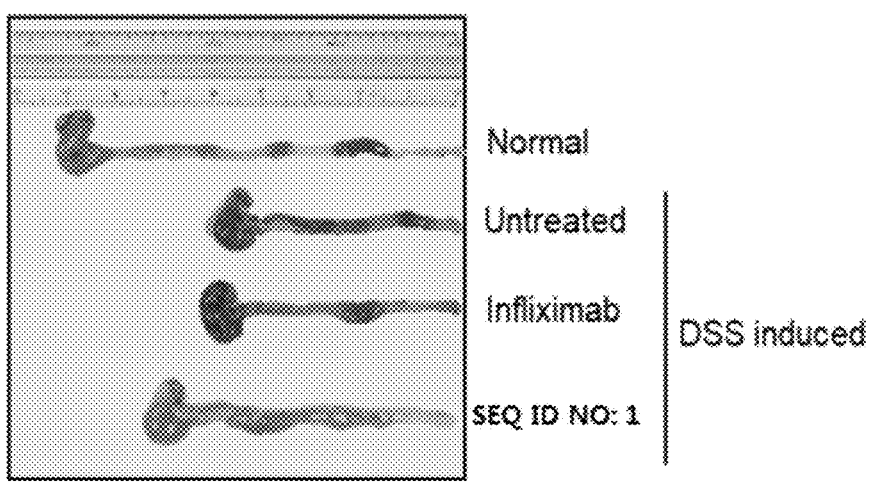
FIGS. 9B to 9G show a photograph of the extracted colons having different lengths after treatment with a positive control infliximab and the peptide of SEQ ID NO: 1 according to the present invention in animal models of DSS-induced chronic inflammatory bowel disease (FIG. 9B), changes in the body weight thereof (FIG. 9C), changes in the colon length (FIG. 9D), the disease activity index (FIG. 9E), the histopathological index of the colon tissue (FIG. 9F), and results of H&E staining of the extracted colon (FIG. 9G).

When body weight was measured for 28 days, the normal group was found to have gained weight, and when DSS was included in drinking water, the body weight decreased, whereas when DSS was not included, the body weight increased. The differences between groups induced by DSS were not significant (FIG. 9B).

Figure 9C:
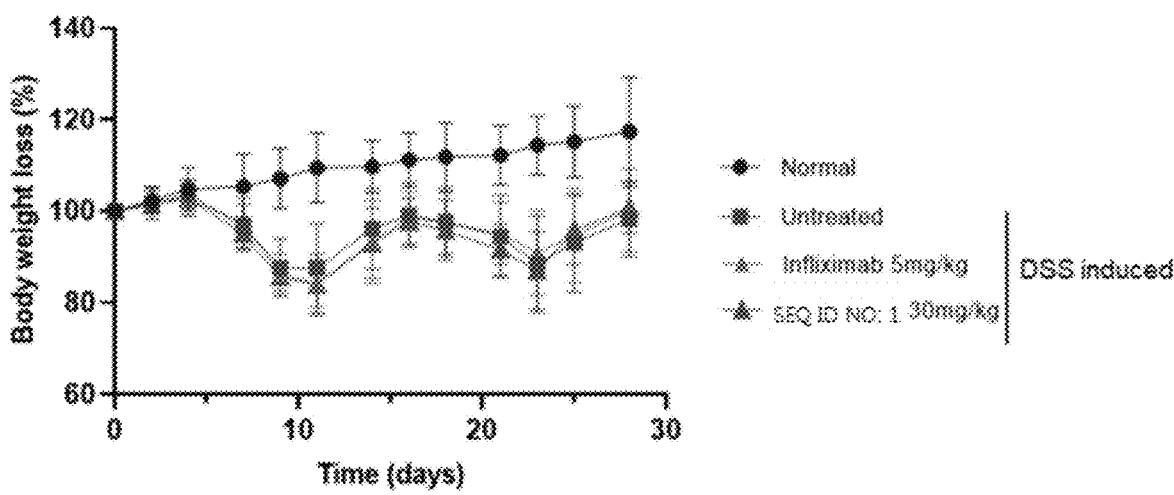
Figure 9D:
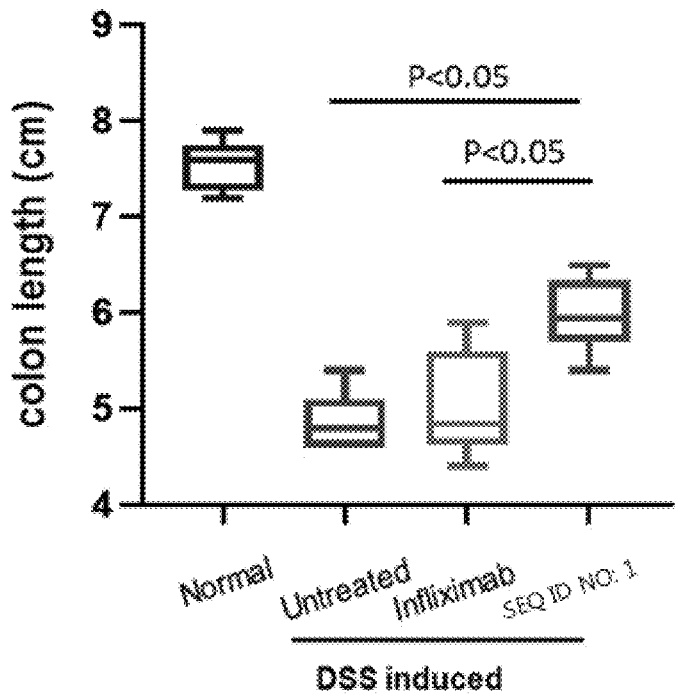

Based on the results of measurement of the length of the extracted colon, in the untreated group with DSS-induced colitis (Untreated), the colon length was remarkably shortened compared to the normal group (Normal), and redness of colon tissue was observed (FIG. 9C). Significantly ($p<0.05$) differently from the untreated group, the groups injected with the peptide of SEQ ID NO: 1 and with infliximab maintained the colon length, and the colon length was longer when using the peptide of SEQ ID NO: 1 (FIG. 9D).

Figure 9E:
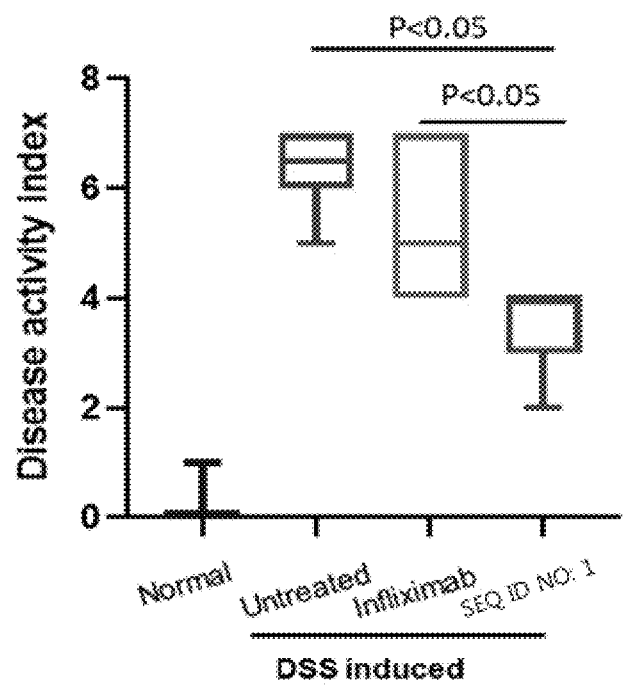

In order to evaluate disease activity, the disease activity index was observed using a DAI scoring system based on changes in body weight and symptoms such as diarrhea and colon bleeding upon autopsy, indicating that the peptide of SEQ ID NO: 1 statistically significantly inhibited disease compared to infliximab ($p<0.05$) (FIG. 9E).

Figure 9F:
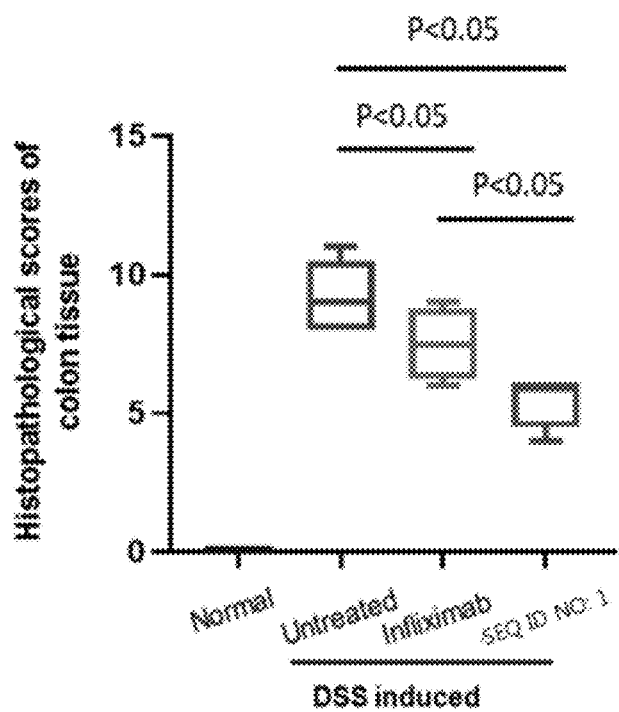
Figure 9G:
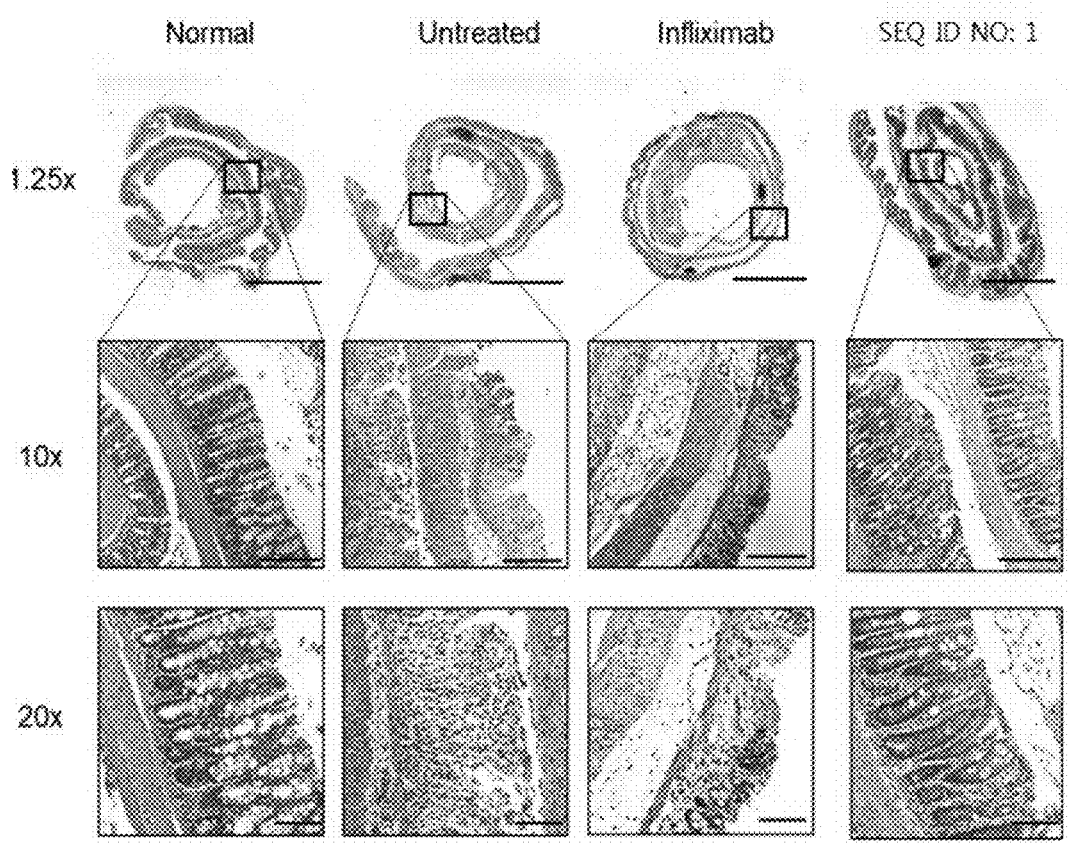

Based on the results of histopathological analysis of colon samples to determine the anti-inflammatory effect of the test material, histological observation showed that the inflammation index was the highest for the DSS-induced inflammation group, followed by infliximab and the peptide of SEQ ID NO: 1. The peptide of SEQ ID NO: 1 exhibited a statistically significantly decreased inflammation index compared to infliximab ($p<0.05$) (FIG. 9F). Representative images of individual intestinal tissues are shown in FIG. 9G. When inflammation was induced with DSS, the inflammatory cell count was increased, the intestinal villi were damaged, and many inflammatory cells (purple dots) were observed in the intestinal mucosa. The group treated with infliximab showed some improvement compared to the untreated group, but villous damage and inflammatory cells in the intestinal mucosa were observed. In the group administered with the peptide of SEQ ID NO: 1, the villi structure was maintained well, and the inflammatory cell count in the intestinal mucosa was significantly decreased (FIG. 9G). Therefore, the peptides of SEQ ID NOs: 1 to 3 were judged to have therapeutic effects both on acute inflammatory bowel disease and on chronic inflammatory bowel disease.

Experimental Example 8: Confirmation of Ability of Synthesized Peptide to Selectively Bind to Integrin Beta 1

In order to confirm the selective binding of peptides of SEQ ID NO: 1 to integrin proteins, immunoprecipitation assay was performed for integrin beta 1, 3, 7, and alpha 4 proteins. Colonic epithelial cells (HT29 cell, ATCC® HTB-38™) were dispensed in an amount of $1\times10^5$ cells/cm$^2$ in a 100 mm Cell culture dish and cultured in DMEM (Dulbecco's Modified Eagle Medium, Gibco) growth medium, containing 10% fetal bovine serum (FBS) until confluent. The cells were treated with the peptides of SEQ ID NO: 1 labeled with biotin at concentrations of 200 and 400 µg/ml for an hour. Cells were then harvested with RIPA buffer (89900, Thermo Fisher Scientific) and the proteins were isolated by centrifugation.

Immunoprecipitation was performed by adding 100 µg of protein samples mixed with 5 ug of anti-biotin antibody (ab53494, abcam), followed by protein A/G Plus agarose beads (sc-2003, santa cruz). Beads were washed thoroughly and isolated protein of interest were separated by SDS-PAGE for western blot analysis. Western blot analysis was performed by separating each protein based on size by SDS-PAGE gel electrophoresis. Separated proteins were transferred to nitrocellulose membrane for dry blotting of proteins, and further processed with anti-integrin beta 1 (sc-374429, santa cruz), anti-integrin beta 3 (sc-46655, santa cruz), anti-integrin beta 7 (sc-166031, santa cruz), and anti-integrin alpha 4 (sc-365209, santa cruz). Target protein bands were visualized using anti-mouse secondary antibody and SuperSignal™ West pico PLUS chemiluminescent Substrate (34579, Thermo Fisher Scientific).

Figure 10:
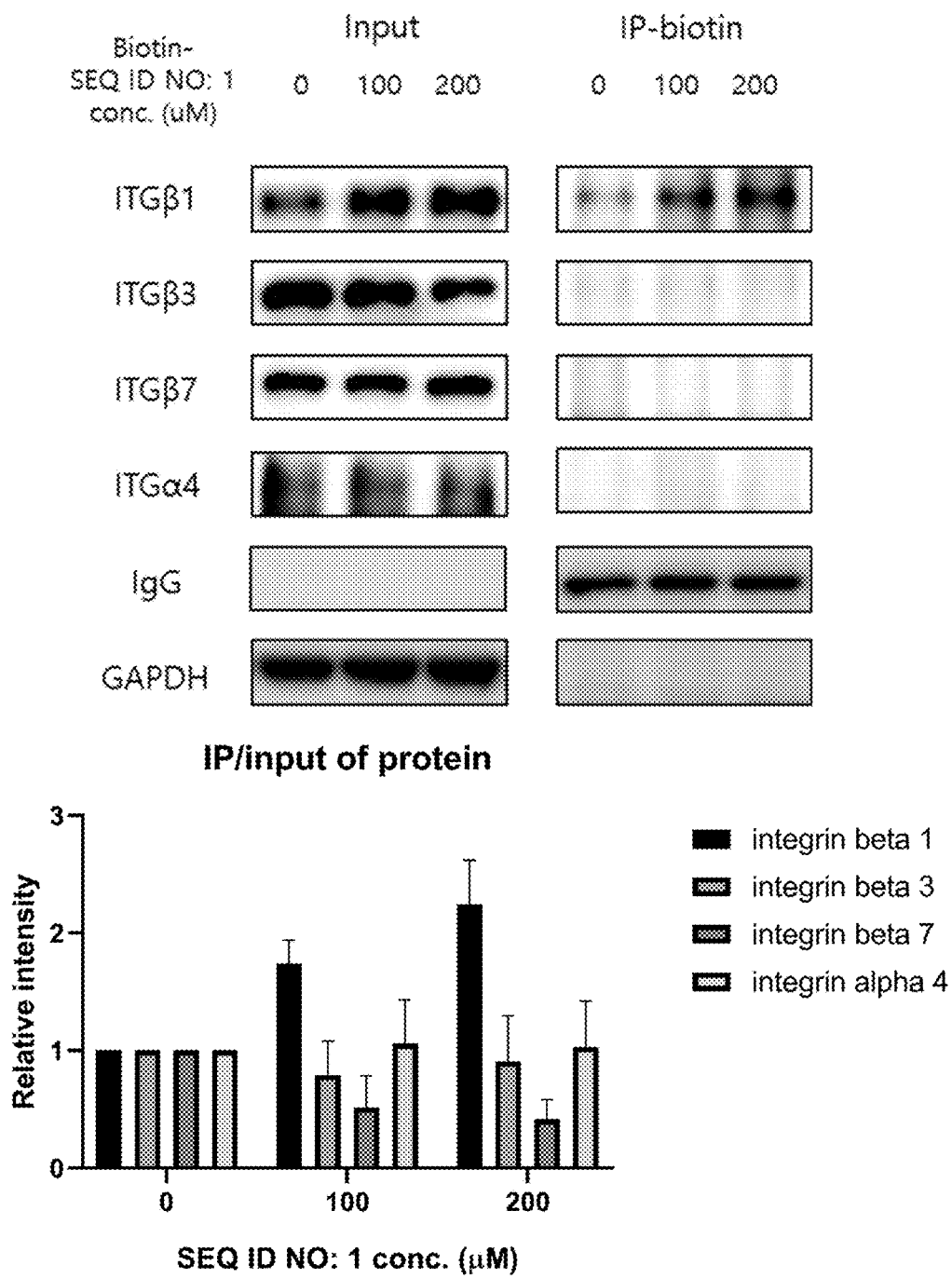
FIG. 10 shows results confirming the binding selectivity of peptides of SEQ ID NO: 1 to Integrins beta 1, 3, 7, and alpha 4 through immunoprecipitation assay, and its quantification graph.

It was found that the peptides of SEQ ID NO: 1 had higher selectivity to integrin beta 1 than other integrin proteins (FIG. 10).

Experimental Example 9: Confirmation of Co-Localization of Synthesized Peptide to Colon in Animal Model of DSS-Induced Acute Inflammatory Bowel Disease In order to confirm co-localization of synthesized peptide to the colon, inflammation was induced in mice using 5% DSS in drinking water for 7 days, followed by the cy5.5-labeled peptide of SEQ ID NO: 1 was IR-injected thereto. An hour after injection, each mouse was sacrificed and the colon tissue was isolated for analysis. Excised colons were fixed with 4% paraformaldehyde, and made frozen tissue block with Tissue-Tek® O.C.T. compound (4583, Sakura). Frozen tissue block was sectioned using clinical cryostat (CM1950, Leica) and placed on microscope slides.

Each sectioned tissue slides were stained for immunofluorescence. In brief, sectioned slides were permeabilized with 0.5% Triton X-100 (9036-19-5, Sigma-Aldrich) in PBS for 10 min. Next, 5% BSA in PBS were treated 30 minutes for blocking, followed by overnight incubation of anti-integrin beta 1 diluted in blocking buffer. After washing the slides, Alexa Fluor 488 conjugated anti-mouse secondary antibody (A-11001, Thermo Fisher Scientific) was diluted and incubated for an hour, and DAPI staining. Slides were mounted for imaging in confocal microscopy (LSM700, Carl Zeiss).

Figure 11:
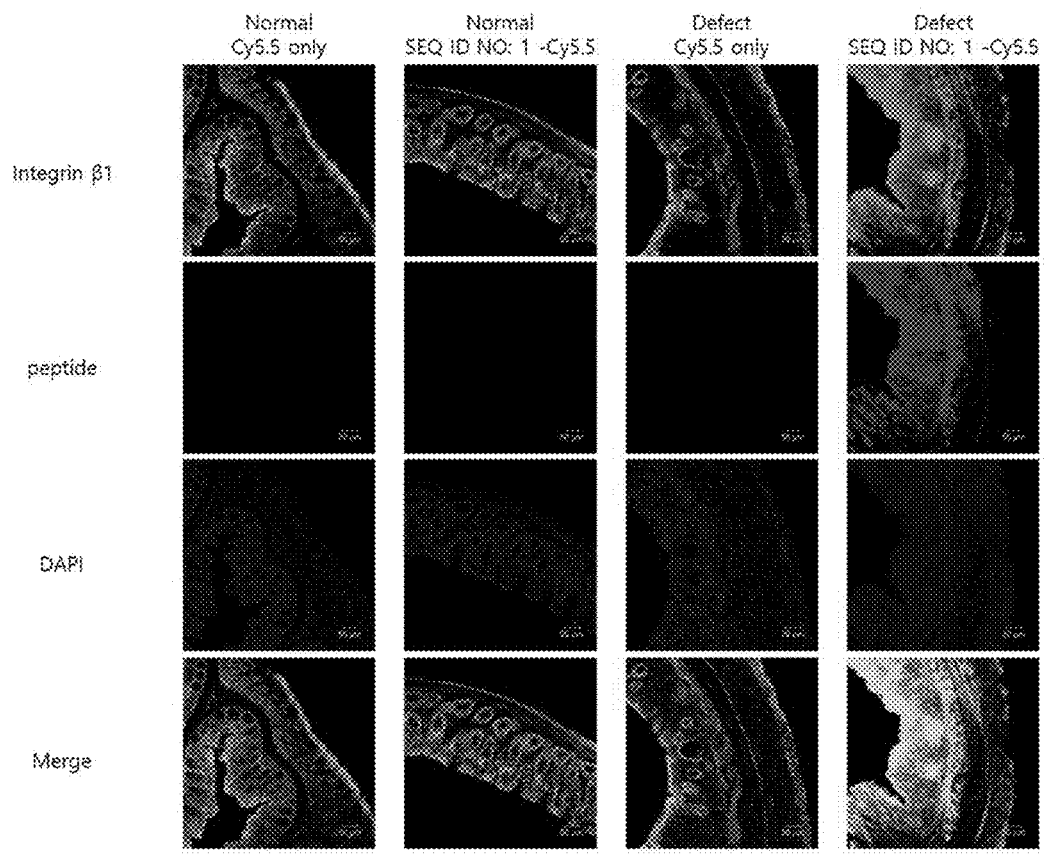
FIG. 11 Shows results of observation with confocal microscope for the peptide co-localization with integrin beta in colon tissue after intraperitoneal injection (IP injection) of the cy5.5-labeled peptide of SEQ ID NO: 1 to animal models of DSS-induced acute inflammatory bowel disease.

As shown in FIG. 11, Normal colon does not show any localization of peptide of SEQ ID NO: 1, but in DSS-induced mouse colon, only peptide of SEQ ID NO: 1 was detected in colon tissue. Furthermore, co-localization of peptide of SEQ ID NO: 1 and integrin beta 1 protein was observed as both fluorescence overlap. This indicated that the peptide of SEQ ID NO: 1 showed binding in the damaged colon and co-localized to integrin beta 1 protein.

Experimental Example 10: Confirmation of Cell Signal Transduction Through Integrin Beta 1

In order to confirm the intracellular signal transduction of SEQ ID NO: 1 through integrin beta 1, western blot was performed for the pFAK, RhoA that related to integrin signal. In addition, the expression level of integrin beta 1 and ZO-1 and Occludin (late stage marker) was measured.

Colonic epithelial cells (HT29 cell, ATCC® HTB-38™) were dispensed in an amount of $1\times10^5$ cells/cm$^2$ in a 100 mm Cell culture dish and cultured in DMEM (Dulbecco's Modified Eagle Medium, Gibco) growth medium, containing 10% fetal bovine serum (FBS) until confluent. The cells were treated with the peptides of SEQ ID NO: 1 of 50, 100, 200 µM with DSS for 30 min. Cells were then harvested with RIPA buffer (89900, Thermo Fisher Scientific) and the proteins were isolated by centrifugation.

Western blot analysis was performed by separating each protein based on size by SDS-PAGE gel electrophoresis. Separated proteins were transferred to nitrocellulose membrane for dry blotting of proteins, and further processed with anti-integrin beta 1 (sc-374429, santa cruz), pFAK (3283, cell signaling technology), FAK (sc-271126, santa cruz), RhoA (sc-179, santa cruz), ZO-1 (339100, thermo scientific), Occludin (331500, thermo scientific), GAPDH (sc-47724, santa cruz). Target protein bands were visualized using anti-mouse secondary antibody and SuperSignal™ West pico PLUS chemiluminescent Substrate (34579, Thermo Fisher Scientific).

Figure 12:
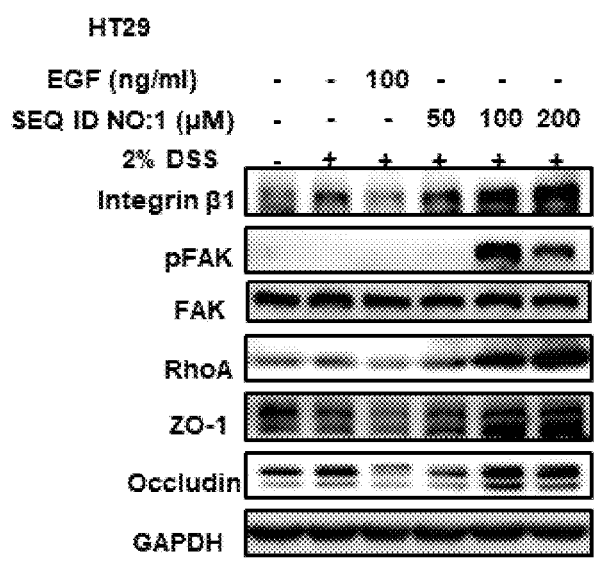
FIG. 12 Shows results of protein expression level of integrin beta 1, pFAK, FAK, RhoA, ZO-1, Occludin, GAPDH by SEQ ID NO: 1 treatment from 50, 100, 200 μM through western blot.
Figure 13:
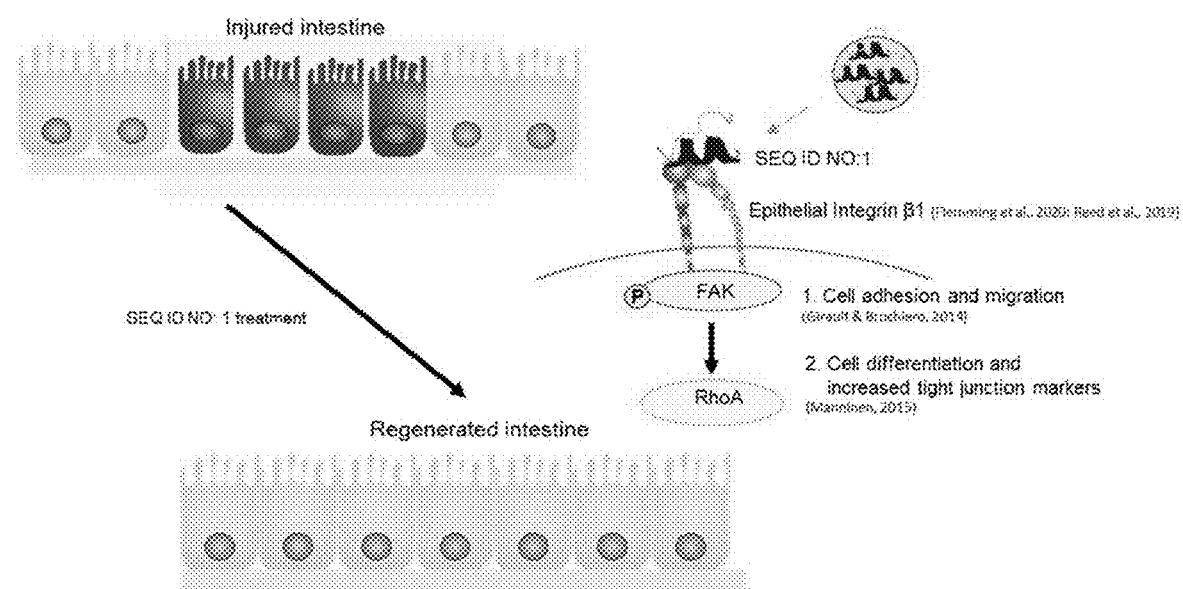
FIG. 13 shows the mechanism of action of SEQ ID NO: 1. Co-localizes on impaired mucosa and binds to integrin beta of intestinal epithelial cells (IECs). Increase IEC adhesion and migration via integrin beta 1 interaction mediated by phospho-FAK signalling. IEC maturation by FAK-RhoA stimulated cell differentiation and polarization, resulting intestine regeneration.

It was found that the peptides of SEQ ID NO: 1 increased the protein expression of integrin beta 1, pFAK, RhoA, and tight junction marker (ZO-1 and Occludin) dose dependently (FIG. 12). Therefore, the mechanism of SEQ ID NO: 1 is that it binds to the integrin beta 1, then the regeneration signal transduced by FAK and RhoA, then finally tight junction marker expression is increased (FIG. 13).

Although specific embodiments of the present invention have been disclosed in detail above, it will be obvious to those of ordinary skill in the art that the description is merely of preferable exemplary embodiments and is not to be construed as limiting the scope of the present invention. Therefore, the substantial scope of the present invention will be defined by the appended claims and equivalents thereof.

INDUSTRIAL APPLICABILITY

The peptide according to the present invention has the binding ability to type VII collagen and suppresses an immune response induced by type VII collagen, thus inhibiting inflammation caused by an autoimmune response, and moreover, promotes cell proliferation and migration in damaged tissue, thereby effectively treating and preventing inflammation caused by autoimmune diseases and healing wounds.

SEQUENCE LIST FREE TEXT

An electronic file is attached.

The invention claimed is:

1. A method of treating inflammatory colitis, ulcerative enteritis, Crohn's disease, or inflammatory bowel disease, comprising administering at least one peptide selected from among peptides represented by the amino acid sequences of SEQ ID NOs: 1 to 3 to a subject in need thereof.

2. The method according to claim 1, wherein the peptide is administered at 1 μg/kg to 100 mg/kg per day, and is administered once a day or 2-3 times a week.

* * * * *

```
SEQUENCE LISTING

<160> NUMBER OF SEQ ID NOS: 7

<210> SEQ ID NO 1
<211> LENGTH: 21
<212> TYPE: PRT
<213> ORGANISM: Artificial Sequence
<220> FEATURE:
<223> OTHER INFORMATION: human bone sialoprotein I 149-169

<400> SEQUENCE: 1

Tyr Gly Leu Arg Ser Lys Ser Lys Lys Phe Arg Arg Pro Asp Ile Gln
1               5                   10                  15

Tyr Pro Asp Ala Thr
            20

<210> SEQ ID NO 2
<211> LENGTH: 20
<212> TYPE: PRT
<213> ORGANISM: Artificial Sequence
<220> FEATURE:
<223> OTHER INFORMATION: human bone sialoprpotein II 41-60

<400> SEQUENCE: 2

Arg Pro Arg Tyr Tyr Leu Tyr Lys His Ala Tyr Phe Tyr Pro His Leu
1               5                   10                  15

Lys Arg Phe Pro
            20

<210> SEQ ID NO 3
<211> LENGTH: 14
<212> TYPE: PRT
<213> ORGANISM: Artificial Sequence
<220> FEATURE:
<223> OTHER INFORMATION: Human osteonectin 160-173

<400> SEQUENCE: 3

Leu Thr Glu Phe Pro Leu Arg Met Arg Asp Trp Leu Lys Asn
1               5                   10

<210> SEQ ID NO 4
<211> LENGTH: 20
<212> TYPE: DNA
<213> ORGANISM: Artificial Sequence
<220> FEATURE:
<223> OTHER INFORMATION: Primer

<400> SEQUENCE: 4
aggggttaag cacaacagca                                              20
```

```
<210> SEQ ID NO 5
<211> LENGTH: 20
<212> TYPE: DNA
<213> ORGANISM: Artificial Sequence
<220> FEATURE:
<223> OTHER INFORMATION: Primer

<400> SEQUENCE: 5
acgacgttag cctcgttctc                                          20

<210> SEQ ID NO 6
<211> LENGTH: 19
<212> TYPE: DNA
<213> ORGANISM: Artificial Sequence
<220> FEATURE:
<223> OTHER INFORMATION: Primer

<400> SEQUENCE: 6
ccagctggta tgggtttcc                                           19

<210> SEQ ID NO 7
<211> LENGTH: 26
<212> TYPE: DNA
<213> ORGANISM: Artificial Sequence
<220> FEATURE:
<223> OTHER INFORMATION: Primer

<400> SEQUENCE: 7
tctactgtcc gtgctataca ttgagt                                   26
```